United States Patent Office 2,779,764
Patented Jan. 29, 1957

2,779,764

HALOGENATED HYDANTOINS

Laurene O. Paterson, Adrian, Mich., assignor to Drug Research, Inc., Adrian, Mich., a corporation of Michigan No Drawing. Application June 22, 1954,
Serial No. 438,633

6 Claims. (Cl. 260—309.5)

The present invention relates to new compounds of hydantoin and their method of manufacture. It particularly concerns N-halogenated 5-substituted hydantoins containing both chlorine and bromine as active components.

The invention is particularly characterized in providing special types of halogenated 5-substituted hydantoins, which are in the form of dry powders and are endowed with the valuable property of acting as highly efficient halogen donors for effecting various organic syntheses. They are especially adapted for the elimination of unsaturated linkages in complex organic compounds, such as polymers of the type of resins and elastomers, where residual unsaturated linkages are undesirable.

The hydantoin is an organic compound having a 5-membered ring structure. Two of the members of the ring are nitrogen atoms, having a valence of three, being in effect imide groups characterized by having one hydrogen atom attached to the nitrogen atom. The carbon components of the ring are three in number, two of them having an oxygen atom attached thereto and the third two hydrogen atoms. These latter are readily substituted by organic radicals of various kinds. For the purposes of the present invention it is preferred to employ substituted hydantoins in which either one or two of the hydrogen atoms is replaced by organic radicals, either aliphatic or aromatic, or mixed. The H atoms attached to the N atoms are rather labile and are readily replaced by halogens, such as chlorine or bromine. The substituted hydantoins used as the starting materials for the practice of the present invention have the structural formula:

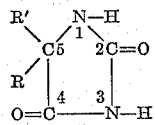

In such 5-substituted hydantoins R may represent an hydrogen atom and R' an aliphatic or aromatic organic radical, or R and R' may represent the same or different aliphatic or aromatic radicals. Hydantoin itself, where R and R' represent hydrogen atoms, does not form stable N-halogenated derivatives. With 5 mono-substituted hydantoins, the stability of such N-halogenated derivatives is increased, while the 5-disubstituted hydantoins are unusually stable halogen carriers. The N-mono chloro, the N-N dichloro, the N-mono bromo and the N-N dibromo compounds of dimethyl hydantoin have been described.

One of the objects of the present invention is to provide a new type of N-halogenated 5-substituted hydantoin wherein such hydantoin contains both chlorine and bromine.

In accordance with the present invention it has been discovered that by controlling the conditions of halogenation it is possible directly to produce mixed N-halogenated hydantoins.

For example, in the manufacture of an N-bromo N-chloro 5-substituted hydantoin, the hydantoin is first reacted with bromine in an aqueous alkaline medium and then the halogenation is completed by the addition of gaseous chlorine. In one method of practicing the present invention, a 5-substituted hydantoin is mixed with water containing known amounts of an alkalizing agent such as sodium hydroxide, sodium carbonate, sodium bicarbonate, or the like, and bromine is added to the mixture in a calculated amount while the rest of the imido-hydrogen is substituted by chlorine. Under the specified conditions it has been found that the bromine reacts initially to form the N-mono bromine derivative and, where the amount of bromine used does not exceed 1 mol equivalent, the product of this first reaction is almost exclusively N-monobromo-5-substituted hydantoin. After such addition of bromine, the chlorine first displaces bromine from the by-product, sodium bromide, to form sodium chloride and bromine chloride. Such bromine chloride then reacts with additional amounts of hydantoin and only after complete substitution by all of the bromine is any chlorine taken up by the hydantoin molecule. It is essential that the mixture remain alkaline, but large excess of base should be avoided. Preferentially some alkali may be present initially and additional amounts added during the course of the reaction.

For the preparation of 5-substituted 1-3 dihalogenated hydantoin two equivalents of an alkali are required for the removal of the hydrogen halide which is formed. Where incomplete saturation of a given quantity of 5-substituted hydantoin with halogen is desired, less alkali may be used and the addition of the chlorine stopped when the reaction mixture becomes slightly acidic.

It can be realized from the above that 1 mol equivalent of bromine, in the form of liquid bromine or as an alkali bromide, may be chlorinated in an aqueous alkaline solution of a 5-substituted hydantoin to form the N-dibromo derivatives. It can be further realized that many degrees of halogenation of the 5-substituted hydantoins are possible and that the proportions of the chlorine and bromine contained therein may be selected for various applications.

The following examples illustrate methods of manufacture of such mixed N-halogenated 5-substituted hydantoins.

Example 1

128 grams of 5-5-dimethyl hydantoin were dissolved in 500 milliliters of water containing 55 grams of Na₂CO₃. The temperature of the solution was lowered to 5° C. and 80 grams of bromine were added, with rapid stirring. When the bromine had been completely taken up, 200 milliliters of a 20% NaOH solution were added and gaseous chlorine introduced until the resultant slurry became neutral in reaction. The product, after filtering, washing and drying, weighed 208 grams. It analyzed 33% bromine and 14.5% chlorine.

Example 2

114 grams of 5-methyl hydantoin were dissolved in 500 milliliters of water containing 80 grams of Na₂CO₃. To this solution were added 103 grams of sodium bromide (NaBr), the temperature lowered to 10° C., and chlorine gas introduced until the reaction mixture reached a hydrogen-ion concentration equivalent to a pH of 6.8. The N-halogenated-5-methyl hydantoin thus formed, after filtering, washing and drying, weighed 205 grams. It analyzed 36.5% bromine and 12.3% chlorine.

Example 3

To a suspension of 142 grams of 5-ethyl-5-methyl hydantoin in 500 milliliters of water there were added 400 milliliters of a cooled 20% solution of NaOH. To this mixture at 10° C. were added 20 grams of bromine with rapid agitation. When all the bromine had been taken up, the halogenation was completed by the introduction of gaseous chlorine. The resulting product weighed 218 grams and analyzed 9% bromine and 27.5% chlorine.

The present invention is not restricted to the above-mentioned N-halogenated hydantoins as the herein-described processes may be carried out with any of the 5-substituted hydantoins where such substituent does not interfere with the halogenation.

Such N-chloro-N-bromo-5-substituted hydantoins react quite differently than hydantoins containing chlorine or bromine alone. For instance, the N-dichloro and N-dibromo derivatives tend to substitute allylic to a double bond, whereas N-chloro-N-bromo dimethyl hydantoins, possibly due to the difference in electronegativity of the released halogens, substitute very readily across the double bond to give complete saturation. This property is particularly valuable in the removal of residual double bonds in the manufacture of certain plastics and synthetic rubber. It has been found that where predominant substitution by one halogen or the other is desired, small percentages of the minor component catalyze the reaction at the double bond. The present invention thus includes the preparation of various mixtures of N-chloro-N-bromo with other N-chlorinated or N-brominated 5-substituted hydantoin derivatives.

*Example 4*

To a solution of 252 grams of 5-5 diphenyl hydantoin in 500 milliliters of water containing 60 grams of NaOH were added, at 10° C., 100 grams of bromine with rapid stirring. When the bromine had been completely taken up, gaseous chlorine was introduced until the resultant slurry became slightly acid. The product, after filtering, washing and drying, weighed 332 grams. It analyzed 27.5% bromine and 2.5% chlorine. This product consists of a mixture of the N-bromo-N-chloro-diphenyl hydantoin with the N-di-bromo derivative. It has been found that even such low percentage of chlorine catalyzes addition reactions with olefinic compounds.

It will be noticed that two different types of what might aptly be termed "multi-halogenated" substituted hydantoins can exist, and can be made by the methods herein described. With the structural formula numbered as hereinabove shown, the bromine may be attached to the nitrogen atom which is vicinal to the 5-substituted carbon atom, or may be attached to the nitrogen atom in the 3-position. Thus there may be N-1 bromo or N-3 bromo 5-substituted hydantoins, or N-1-bromo-N-3-chloro, or N-1-chloro-N-3-bromo compounds. It has not been definitely established that the N-chloro-bromo compounds produced in accordance with the herein described methods are not mixtures of such isomers. In the subjoined claims, both types of chloro-bromo or bromo-chloro products are claimed.

While the radicals on the carbon in the 5-position are given in the examples as being methyl (Example 1 is dimethyl, Example 2 is 5-methyl, the other R being H, Example 3 is again dimethyl, and Example 4 is ethylmethyl) it is to be understood that considerable variations are possible such as 5-5-diethyl, 5-propyl-methyl, 5-propyl-propyl, or combinations of aliphatic and aromatic radicals.

I claim:

1. An N-bromo-N-chloro-5,5-disubstituted hydantoin in which one substituent in the 5 position is selected from the group consisting of hydrogen, a lower alkyl radical and a phenyl radical and in which the other substituent in the 5 position is selected from the group consisting of a lower alkyl radical and a phenyl radical.

2. An N-bromo-N-chloro-5,5-dimethyl hydantoin.

3. An N-bromo-N-chloro-5-methyl hydantoin.

4. An N-bromo-N-chloro-5-ethyl-5-methyl hydrantoin.

5. An N-bromo-N-chloro-5,5-diphenyl hydantoin.

6. A composition of matter consisting essentially of an N-bromo-N-chloro-5,5-disubstituted hydantoin in which one substituent in the 5 position is selected from the group consisting of hydrogen, a lower alkyl radical and a phenyl radical and in which the other substituent in the 5 position is selected from the group consisting of a lower alkyl radical and a phenyl radical in admixture with an N,N-dihalo-5,5-disubstituted hydantoin wherein the two halogen substituents are the same and are selected from the group consisting of bromine and chlorine and wherein one substituent in the 5 position is selected from the group consisting of hydrogen, a lower alkyl radical and a phenyl radical and in which the other substituent in the 5 position is selected from the group consisting of a lower alkyl radical and a phenyl radical.

References Cited in the file of this patent

UNITED STATES PATENTS 2,430,233    Magill _____ Nov. 4, 1947

OTHER REFERENCES

Biltz et al.: Chem. Abstracts, vol. 21, pp. 1794–5 (1927).
Orazi et al.: Chem. Abstracts, vol. 44, col. 5829 (1950).
Orazi et al.: Chem. Abstracts, vol. 44, col. 7778 (1950).
Orazi et al.: Chem. Abstracts, vol. 47, col. 3244 (1953).